US008994884B2

(12) United States Patent
Hashimoto et al.

(10) Patent No.: US 8,994,884 B2
(45) Date of Patent: Mar. 31, 2015

(54) BROADCAST RECEIVER AND ELECTRONIC DEVICE

(75) Inventors: Seiji Hashimoto, Tokyo (JP); Tetsuhiko Fukazawa, Tokyo (JP); Tomohiro Hamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 599 days.

(21) Appl. No.: 13/233,873

(22) Filed: Sep. 15, 2011

(65) Prior Publication Data
US 2012/0218474 A1 Aug. 30, 2012

(30) Foreign Application Priority Data

Feb. 14, 2011 (JP) ................................. 2011-029109

(51) Int. Cl.
*H04N 5/65* (2006.01)
*H04N 5/655* (2006.01)
*G11B 33/12* (2006.01)

(52) U.S. Cl.
CPC .............. *G11B 33/124* (2013.01); *H04N 5/655* (2013.01)
USPC ........... 348/836; 348/825; 348/839; 348/794; 361/752

(58) Field of Classification Search
CPC ....... H04N 5/655; H04N 5/65; G11B 33/124; G11B 33/123
USPC ................ 348/825, 836, 839, 838, 725, 794; 361/728, 730, 752, 760, 729
See application file for complete search history.

(56) References Cited

U.S. PATENT DOCUMENTS

| 6,888,718 B2 | 5/2005 | Nakamura |
| 7,502,223 B2 | 3/2009 | Tatsukami |
| 2006/0087016 A1 | 4/2006 | Wada et al. |
| 2011/0157850 A1* | 6/2011 | Kitamura et al. ............. 361/752 |

FOREIGN PATENT DOCUMENTS

| JP | 06-176555 | 6/1994 |
| JP | 2002-358773 | 12/2002 |
| JP | 2004-139670 | 5/2004 |
| JP | 2004-197821 | 7/2004 |
| JP | 2006-119983 | 5/2006 |
| JP | 2008-046882 | 2/2008 |
| JP | 2010-192903 | 9/2010 |

OTHER PUBLICATIONS

Japanese Patent Application No. 2011-029109, Notice of Rejection, mailed Jan. 4, 2012, (with English Translation).

* cited by examiner

*Primary Examiner* — Jefferey Harold
*Assistant Examiner* — Jean W Desir
(74) *Attorney, Agent, or Firm* — Blakely, Sokoloff, Taylor & Zafman LLP

(57) ABSTRACT

According to one embodiment, a broadcast receiver includes a housing, a circuit board, a module, a holder, and a buffer. The housing is provided with a wall. The circuit board is housed in the housing and includes a first connector. The module includes a second connector to be electrically connected to the first connector and fits to the first connector with a gap therebetween. The module is movable between a first position where the length of connected portions of the first connector and the second connector is short and a second position where the length of the connected portions is long. The holder holds the module. The buffer is provided to the holder and is bent along with the movement of the module from the first position to the second position.

11 Claims, 18 Drawing Sheets

BROADCAST RECEIVER AND ELECTRONIC DEVICE

CROSS-REFERENCE TO RELATED APPLICATIONS

This application is based upon and claims the benefit of priority from Japanese Patent Application No. 2011-029109, filed Feb. 14, 2011, the entire contents of which are incorporated herein by reference.

FIELD

Embodiments described herein relate generally to a broadcast receiver and an electronic device.

BACKGROUND

There have been known electronic devices such as broadcast receivers and personal computers (PCs) provided with a module such as, for example, a hard disk drive (HDD). In such an electronic device, the module is connected to a connector of a circuit board via a flexible cable. Some of the electronic devices configured as above absorb at least part of load (shock load) acting on the module when falling or the like by the flexible cable connected to the module.

The flexible cable of the conventional electronic devices such as broadcast receivers increases the components, which may require additional manufacturing process and costs.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
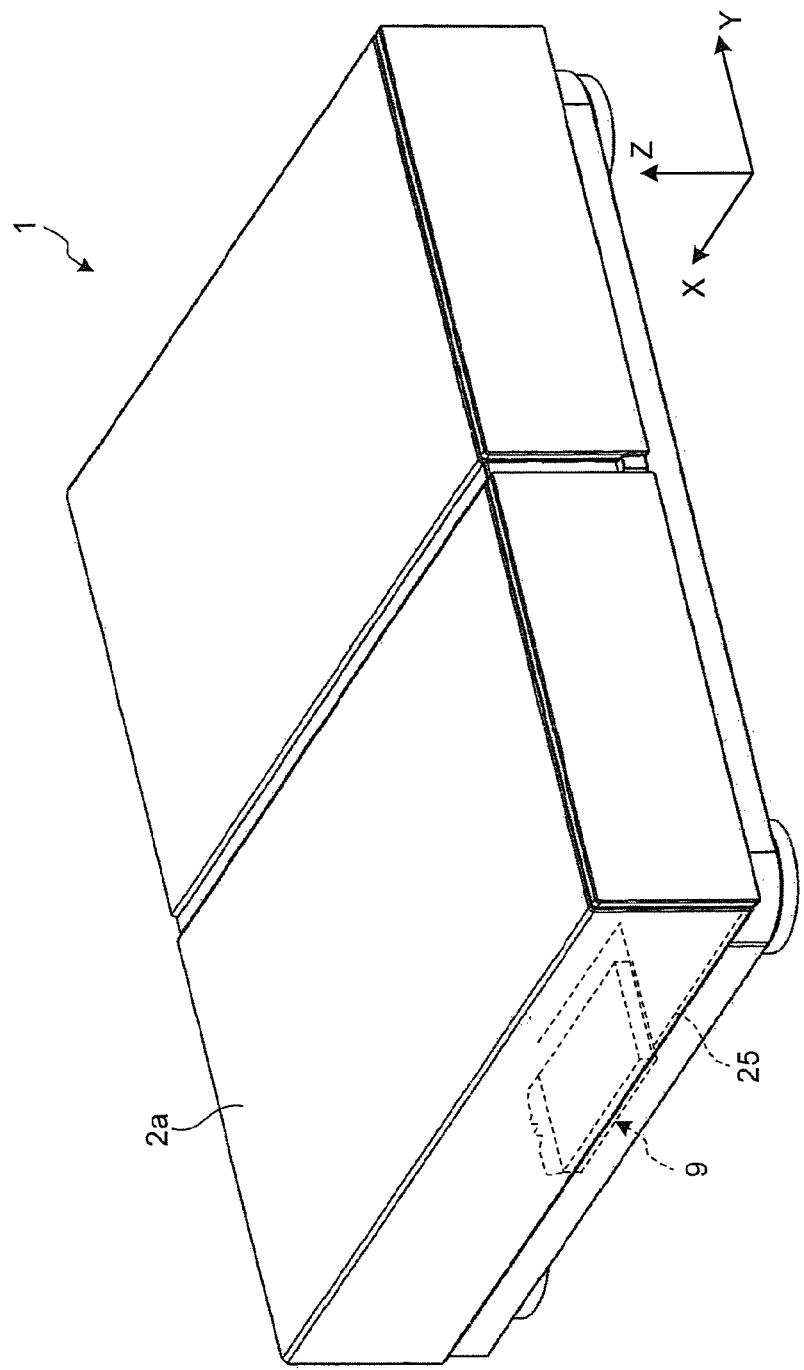
FIG. 1 is an exemplary perspective view of a broadcast receiver according to a first embodiment.

In general, according to one embodiment, a broadcast receiver comprises a housing, a circuit board, a module, a holder, and a buffer. The housing comprises a wall. The circuit board is housed in the housing and comprises a first connector. The module comprises a second connector configured to be electrically connected to the first connector and to fit to the first connector with a gap therebetween. The module is configured to be movable between a first position where the length of connected portions of the first connector and the second connector is short and a second position where the length of the connected portions is long. The holder is configured to hold the module. The buffer is provided to the holder and is configured to be bent along with the movement of the module from the first position to the second position.

Exemplary embodiments will be described in detail below with reference to the accompanying drawings, in which like elements are designated by like reference numerals, and their description is not repeated.

According to a first embodiment, a broadcast receiver 1 is used as being connected to a television receiver, a display device having no receiving function, or the like. The broadcast receiver 1 has the functions of receiving broadcast waves of various television (TV) programs, recording a TV program, and the like. The broadcast receiver 1 comprises a flat rectangular parallelepiped housing 2a. The housing 2a houses therein components to implement the above functions. Examples of the components include a circuit board 25, a device provided to the circuit board 25 and constituting a controller, a tuner, an image processor, and the like, and a cooling mechanism including a fan for cooling a heat generating component such as the device, and a first connector (all but the circuit board 25 are not illustrated in FIG. 1). The housing 2a also houses a hard disk drive (HDD) unit 9 including HDD as a module. In the first embodiment, for the sake of convenience, directions are defined based on the use state of the broadcast receiver 1 as follows: X direction indicates the depth direction of the housing 2a; Y direction indicates the width direction (horizontal direction) of the housing 2a; and Z direction indicates the thickness direction (vertical direction) of the housing 2a. The X, Y, and Z directions are perpendicular to one another.

Figure 2:
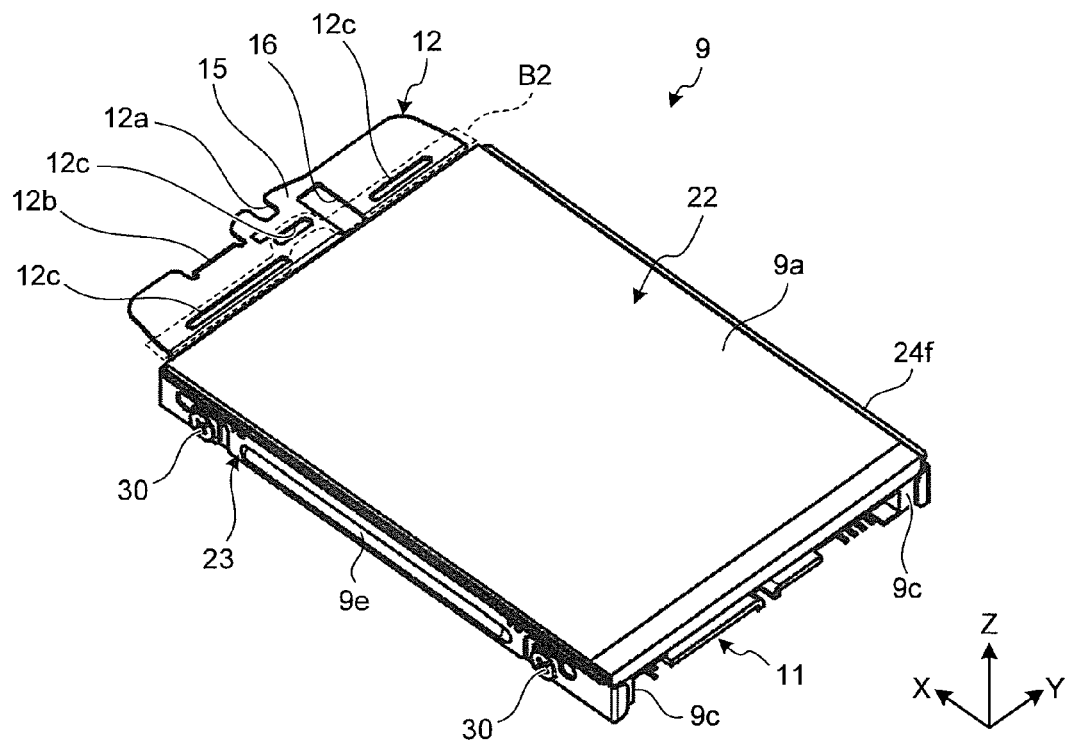
FIG. 2 is an exemplary perspective view of a module in the broadcast receiver in the first embodiment.
Figure 3:
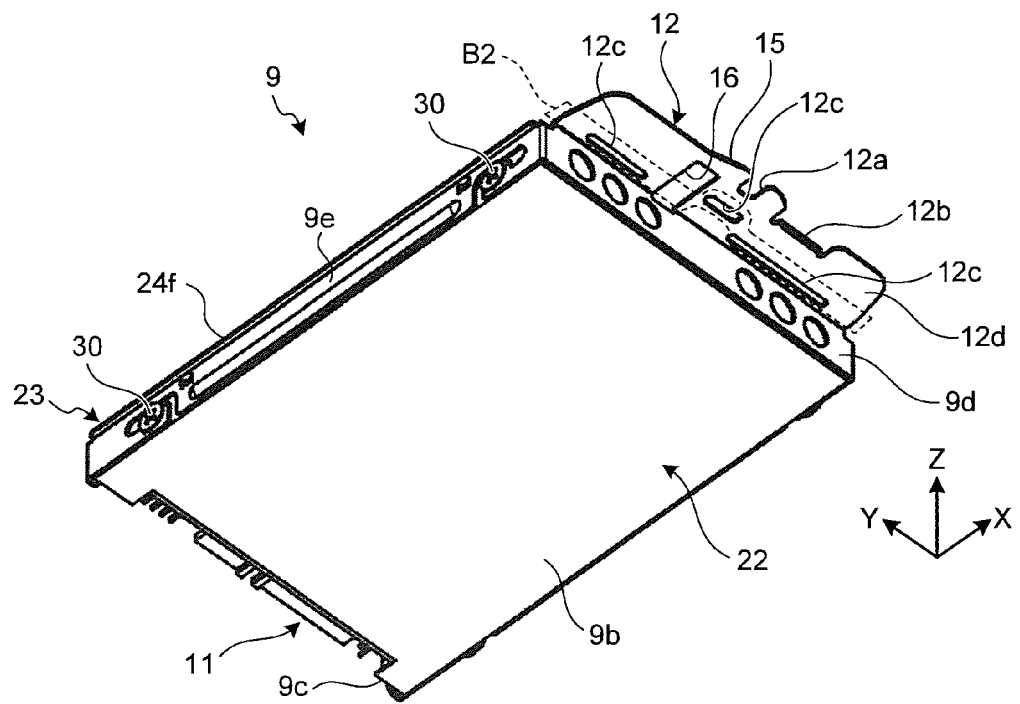
FIG. 3 is an exemplary perspective view of the module in the broadcast receiver viewed from a different direction than in FIG. 2 in the first embodiment.

As illustrated in FIGS. 2 and 3, the HDD unit 9 has a rectangular first surface 9a and a rectangular second surface 9b. The HDD unit 9 is formed thin and flat in a direction perpendicular to the first surface 9a and the second surface 9b (the thickness direction, i.e., the Z direction when assembled).

The HDD unit 9 is fixed to the housing 2a with a bracket 12. The bracket 12 protrudes outward along the first surface 9a from the first surface 9a side of a side surface 9d opposite a side surface 9c provided with a second connector 11. The bracket 12 is formed in a flat plate-like shape. The bracket 12 is provided with a notch 12a at the distal edge as a through portion to allow a screw (not illustrated) as a fastener pass therethrough. The notch 12a opens in a direction in which the second connector 11 is away from the first connector (not illustrated), i.e., a direction opposite the direction in which the second connector 11 connects to the first connector (the X direction). The bracket 12 is also provided with a slit 16 having a constant width and extending in the direction in which the second connector 11 connects to the first connector (the X direction). The bracket 12 is further provided with a claw-like protrusion 12b at the distal edge. The protrusion 12b is raised to the second surface 9b side. Besides, the bracket 12 is provided with a plurality of spindly slits 12c extending along the side surface 9d (along the Y direction). The slits 12c form a second buffer B2 that is deformed easier than other parts of a holder 23.

Figure 4:
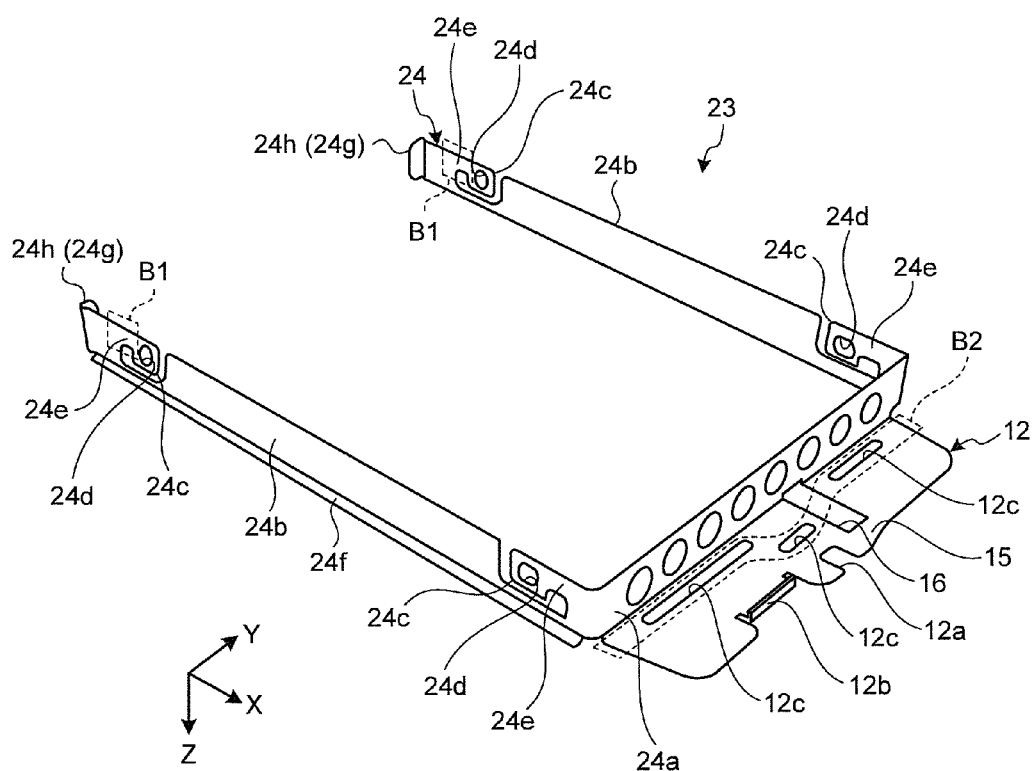
FIG. 4 is an exemplary perspective view of a holder of the module in the broadcast receiver in the first embodiment.

The HDD unit 9 comprises an HDD 22 and the holder 23. As illustrated in FIG. 4, the holder 23 of the first embodiment comprises a surrounding portion 24 integrally with the bracket 12. The surrounding portion 24 includes three frames 24a, 24b, and 24b formed in a C shape, and surrounds three side surfaces of the HDD 22 except the side surface 9c provided with the second connector 11. The surrounding portion 24 is provided with a plurality of (four, in the first embodiment) holding portions 24c each having a through hole 24d to allow a screw 30 (see FIGS. 2 and 3) as a fastener to fix the HDD 22 and the holder 23 pass therethrough. The holding portions 24c are connected to the frames 24b via arms 24e, respectively. Preferably, the holder 23 is formed as a metal member (plate) made of, for example, a conductive material such as a metal material. In this structure, the arms 24e are each an example of a narrow portion that is relatively narrow compared to other parts of the frames 24b as well as an example of a first buffer B1 that is deformed easier than other parts of the frames 24b.

The two frames 24b extending in parallel have ends 24g, respectively, on the second connector 11 side that are bent in directions toward each other. Namely, the ends 24g are provided with bent portions 24h, respectively.

The frame 24b of the holder 23 comprises a flange 24f as a reinforcing portion extending along the edge of the frame 24b from the second connector 11 side (the side opposite the bracket 12) to the bracket 12 side. In the first embodiment, the flange 24f extends over the holding portions 24c at two points on both longitudinal ends of the frame 24b in the longitudinal direction from the end 24g to the frame 24a.

Figure 5:
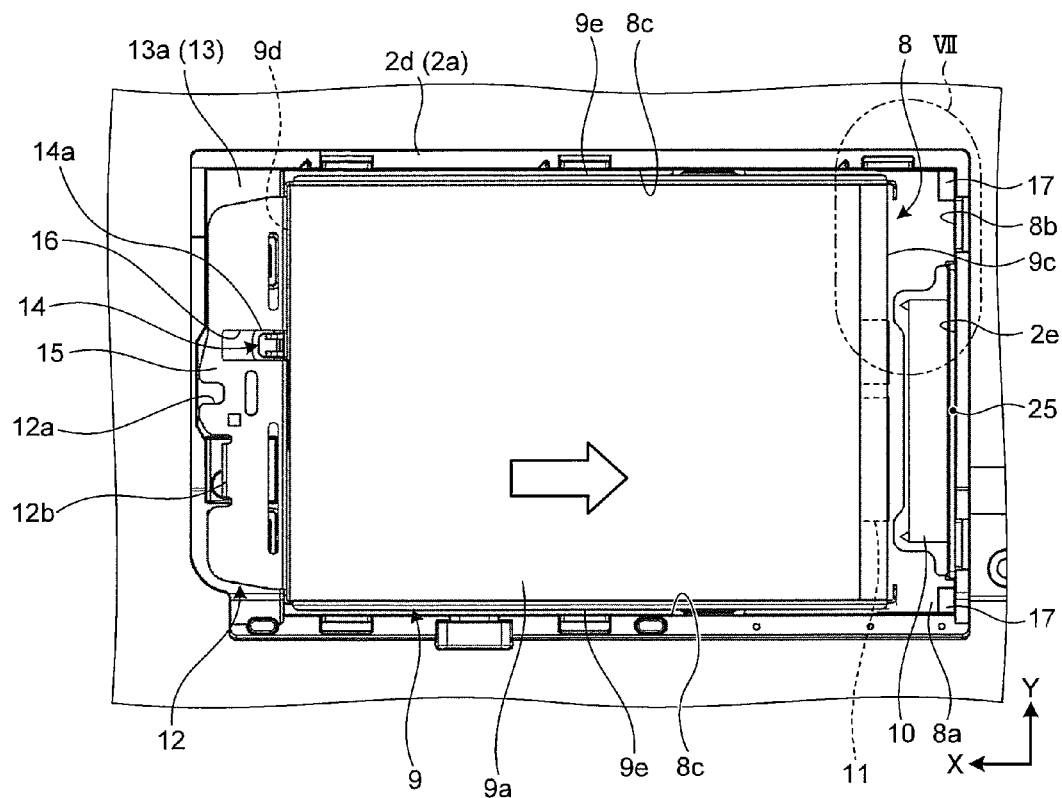
FIG. 5 is an exemplary plan view of the module in the broadcast receiver before being fixed in a housing in the first embodiment.
Figure 6:
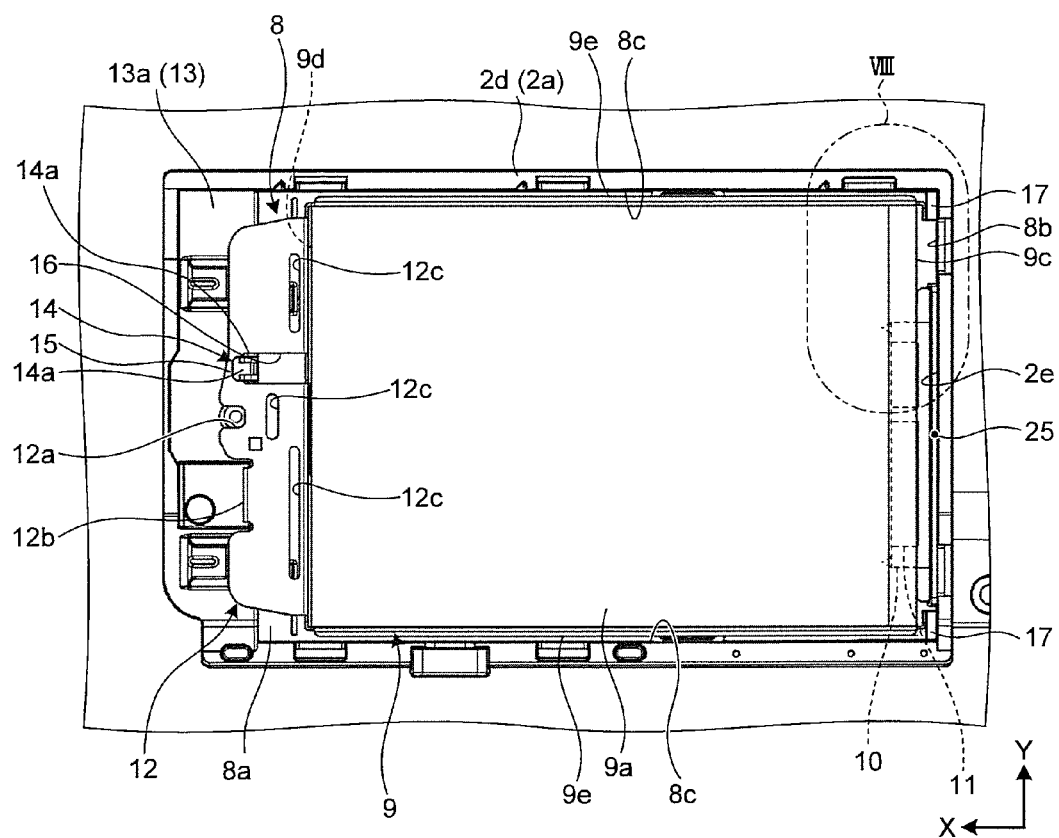
FIG. 6 is an exemplary plan view of the module in the broadcast receiver after being fixed in the housing in the first embodiment.

As illustrated in FIGS. 5 and 6, the HDD unit 9 is housed in a recess 8 as an HDD housing (a module housing, a housing, an opening) that is, for example, a rectangular opening in a plan view formed in a wall 2d in the housing 2a. The circuit board 25 is provided with a first connector 10 configured to be connected to the second connector 11 of the HDD 22. The recess 8 has a rectangular bottom surface 8a in a plan view. The first connector 10 is located on a side surface 8b of the recess 8 on a side in the X direction. The first connector 10 is relatively firmly fixed to the circuit board 25 housed in the housing 2a, and is exposed (protrudes) in the recess 8 via an opening 2e formed in the side surface 8b. There is a gap at least partly between side surfaces 8c of the recess 8 on both sides in the Y direction and side surfaces 9e of the HDD unit 9 in the recess 8, respectively. The gap is located at a position where the side surfaces 8c face the arms 24e as first buffers, which will be described later, respectively, at least in the sate where the HDD unit 9 is installed in the housing 2a. To other parts of the side surfaces 8c, there may be provided a guide member (for example, an elastic member) for guiding the slide (movement) of the HDD unit 9 when the second connector 11 is inserted in the first connector 10, a member functioning as a conductive member for ground connection, and the like.

Figure 7:
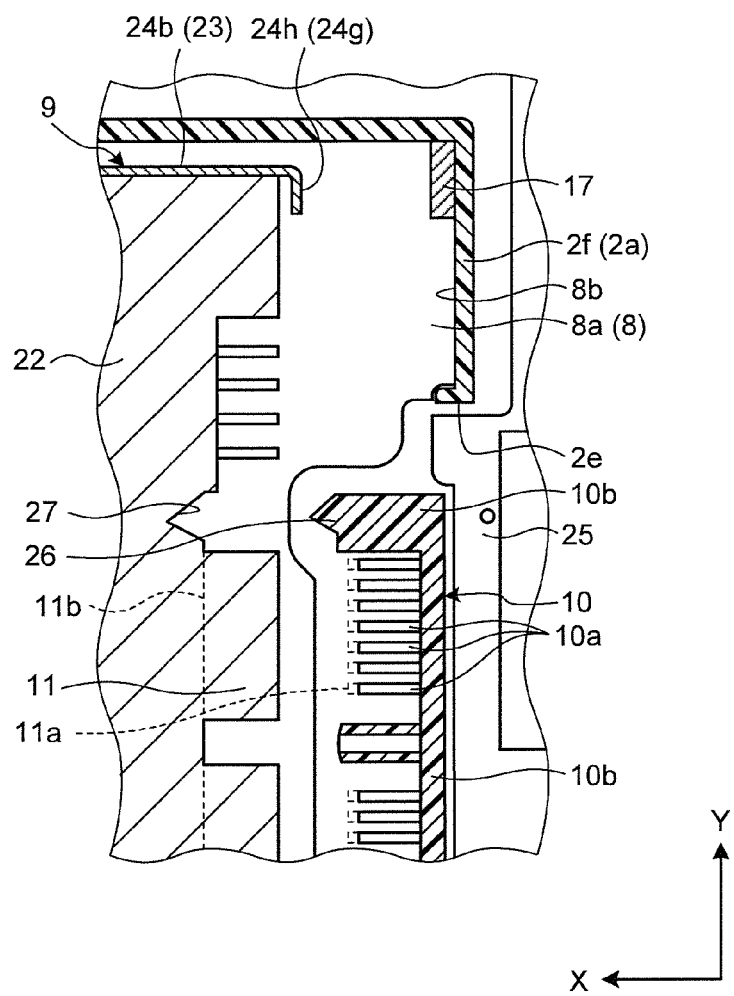
FIG. 7 is an exemplary enlarged cross-sectional view of a VII portion of FIG. 5 in the first embodiment.
Figure 8:
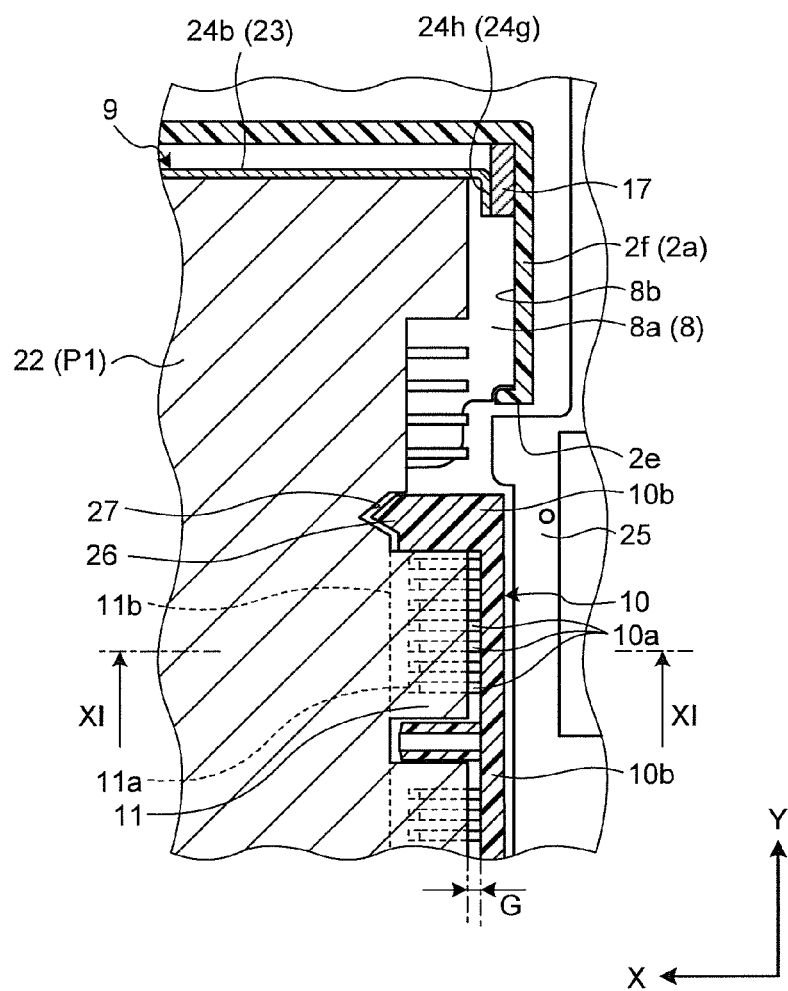
FIG. 8 is an exemplary enlarged cross-sectional view of a VIII portion of FIG. 6 in the first embodiment.

As illustrated in FIGS. 7 and 8, the first connector 10 is formed as, for example, a flat female connector extending along the Y direction. The first connector 10 comprises a base 10b extending along the Y direction and a plurality of terminals 10a aligned in the Y direction. The circuit board 25 is housed in the housing 2a and is fixed to the housing 2a by a screw (not illustrated) or the like. On the other hand, the second connector 11 is formed as, for example, a flat male connector extending along the Y direction. The second connector 11 comprises a base 11b extending along the Y direction and a plurality of terminals 11a aligned in the Y direction.

The recess 8 is provided with a step 13 on the other side in the X direction. The step 13 is substantially parallel to the bottom surface 8a and is located between the bottom surface 8a and the opening edge of the recess 8. In the state where the HDD unit 9 is housed in the recess 8, a back surface 12d of the bracket 12 is in contact with a top surface 13a of the step 13. The second connector 11 provided to the side surface 9c is connected to the first connector 10 exposed in the recess 8, and thus the HDD unit 9 is installed in the recess 8. The direction in which the first connector 10 is connected to the second connector 11 is along the longitudinal direction of the HDD unit 9 (the X direction).

When placed in the recess 8, first, as illustrated in FIG. 5, the HDD unit 9 is located closer to the side opposite the first connector 10 in the recess 8. Besides, the back surface 12d (see FIG. 3) of the bracket 12 is in contact with the top surface 13a of the step 13, and a first engagement portion 14 passes through the slit 16. The slit 16 is a little wider than the first engagement portion 14.

Then, the HDD unit 9 is slid toward the first connector 10 in the X direction (the right side in FIGS. 5 and 6) while being pushed to the bottom side of the recess 8 (the bottom surface 8*a* side). With this, the second connector 11 is connected to the first connector 10 and, on the opposite side, a claw 14*a* of the first engagement portion 14 engages with a second engagement portion 15 as an end portion of the slit 16 located opposite the second connector 11. Thus, the HDD unit 9 is installed in the recess 8 and is temporarily held (yet to be fixed by a screw as a fastener or the like).

Along with the transition of the HDD unit 9 from the state of FIG. 5 to that of FIG. 6, the state of the first connector 10 and the second connector 11 transits from the state of FIG. 7 to that of FIG. 8. As illustrated in FIGS. 7 and 8, on the side surface 8*b* of the recess 8 (a wall 2*f* of the housing 2*a* that constitutes the recess 8), a component 17 is provided at a position facing the bent portion 24*h* formed at the end 24*g* of the frame 24*b* of the holder 23. In the state where the HDD unit 9 is installed in the housing 2*a* as illustrated in FIG. 8, the end 24*g* of the holder 23 is in contact with the component 17. In this manner, the component 17 is capable of functioning as a positioning member for the HDD unit 9 as well as the end 24*g*.

Figure 11:
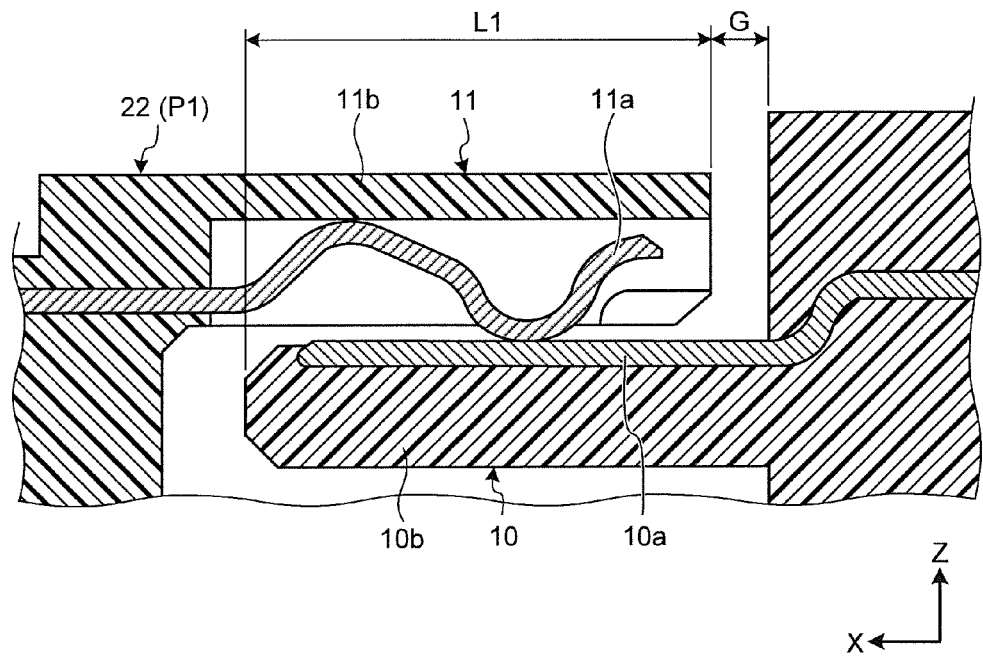
FIG. 11 is an exemplary cross-sectional view taken along line XI-XI in FIG. 8 in the first embodiment.

In the first embodiment, as illustrated in FIG. 8, in the state where the HDD unit 9 is installed in the housing 2*a*, the second connector 11 is not inserted into the deepest position of the first connector 10, and there is a gap G between the first connector 10 and the second connector 11. Despite the gap G, as illustrated in FIG. 11, the terminals 10*a* of the first connector 10 and the terminals 11*a* of the second connector 11 are electrically connected.

For example, the component 17 is made of a relatively rigid material such as a metal material. Accordingly, if an inertial force acts on the HDD unit 9 from the left to the right in FIG. 8 when the housing 2*a* falls or an external force acts on the HDD unit 9 from the right in FIG. 8, the load is transmitted to the end 24*g* of the holder 23 via the component 17. Namely, the component 17 is an example of a rigid member or a load transmitter.

Figure 9:
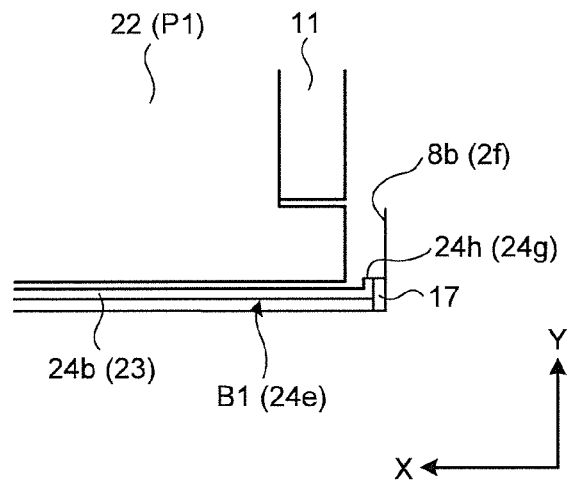
FIG. 9 is an exemplary schematic plan view of an edge of the holder of the module in the broadcast receiver in normal state in the first embodiment.
Figure 10:
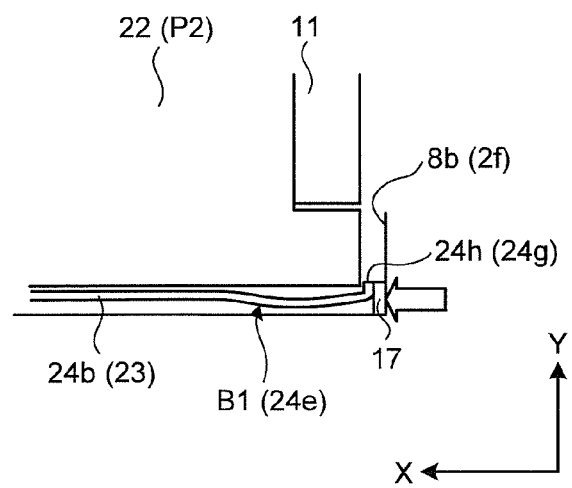
FIG. 10 is an exemplary schematic plan view of the edge of the holder illustrated in FIG. 9 that is deformed in the first embodiment.

As described above, according to the first embodiment, the frame 24*b* of the holder 23 is provided with the arm 24*e* as the first buffer (see FIG. 4). Besides, there is the gap G between the first connector 10 and the second connector 11. Accordingly, for example, if a force acts on the housing 2*a* or the HDD 22 in the direction in which the wall 2*f* comes close to the HDD 22 (i.e., the direction in which the first connector 10 and the second connector 11 are connected or fitted to each other), and if the force is larger than a predetermined value, the arm 24*e* as the first buffer in the state of FIG. 9 is plastically deformed (i.e., buckled or bent) as illustrated in FIG. 10 due to receipt of compression load from the housing 2*a* (the component 17) and the HDD 22, thereby absorbing the energy. Thus, according to the first embodiment, it is possible to suppress an excessive load (force) from acting on the HDD 22 or the housing 2*a*. In the example of FIG. 10, as is obvious in comparison with FIG. 9 illustrating normal state before deformation, the frame 24*b* of the holder 23 is swollen in a convex form in a direction away from a side surface of the HDD 22 at the position where the arm 24*e* is located. Incidentally, the frame 24*b* may be deformed over a wider range including the arm 24*e*. In the first embodiment, the arm 24*e* (the first buffer B1) is an example of a narrow portion narrower (smaller in cross-sectional area) than other (general) parts of the holder 23, a stress concentration portion, or a fragile portion relatively more fragile than the other parts. Stress is likely to concentrate on the arm 24*e* as the narrow portion, which facilitates the deformation of the holder 23 including the arm 24*e*. The term "plastic deformation" as used herein refers to not restorable elastic deformation but unrestorable deformation (permanent deformation). The plastic deformation is not limited to bending such as buckling, but includes, for example, breakage, stretch, and the like.

According to the first embodiment, the arm 24*e* is located between the holding portion 24*c* and the end 24*g* of the holder 23 on the wall 2*f* side. Accordingly, due to compression load acting between the holding portion 24*c* and the end 24*g*, the arm 24*e* is likely to be buckled (bent). Further, the holding portion 24*c* is located closer to the end 24*g* than to the center (gravity center) of the HDD 22, and thereby the holding portion 24*c* can be arranged relatively close to the end 24*g*. With this, compared to the case where the holding portion 24*c* is located distant from the end 24*g*, the arm 24*e* is more concentrically loaded, which facilitates to achieve the effect of the plastic deformation of the arm 24*e*.

As described above, according to the first embodiment, there is the gap G between the first connector 10 and the second connector 11. Accordingly, contact between the first connector 10 and the second connector 11 suppresses the prevention of the deformation of the arm 24*e*.

Figure 12:
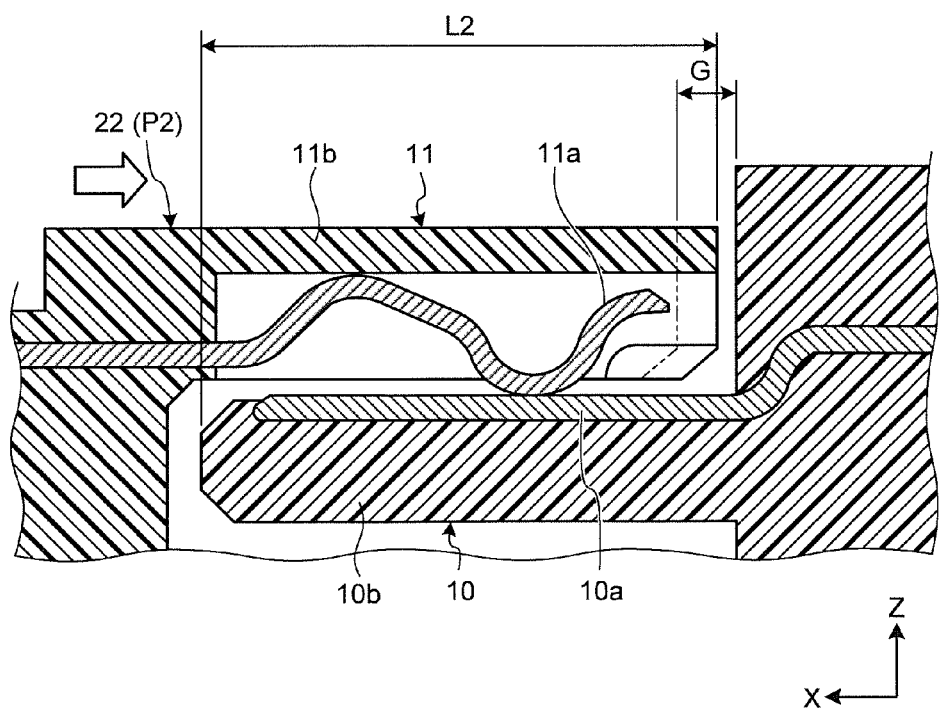
FIG. 12 is an exemplary view of a structure illustrated in FIG. 11 in which a gap between first and second connectors is narrower in the first embodiment.

That is, as illustrated in FIGS. 11 and 12, along with the buckling (deformation, plastic deformation, bending) of the arm 24*e*, the HDD 22 and the second connector 11 move relative to the housing 2*a* from the first position (initial position, set position) P1 to the second position P2 (movement position). The first position P1 is a position of the HDD 22 that is inserted in the first connector 10 relatively shallowly when the HDD unit 9 is set in the housing 2*a*. The second position P2 is a position of the HDD 22 that is inserted in the first connector 10 relatively deeply and is closer to the first connector 10 than the first position P1. In other words, the HDD 22 as a module is movable at least between the first position P1 and the second position P2. The arm 24*e* as a buffer is buckled (deformed, plastically deformed, bent) along with the movement (relative movement) of the HDD 22 as a module from the first position P1 to the second position P2. The term "movable" used here does not mean that the module is movable in normal state, but means that the module is movable in specific state such as, for example, when the broadcast receiver 1 as an electronic device falls, i.e., load or stress acting on the arm 24*e* as a buffer exceeds a predetermined threshold (a limit value, a yield point, 0.2% proof stress, etc.).

The length of connected portions of the first connector 10 and the second connector 11 at the second position P2 (second connection length, long connection length) L2 is longer than the length of connected portions of the first connector 10 and the second connector 11 at the first position P1 (first connection length, short connection length) L1 (L1<L2). Preferably, the second position P2 is located at the deepest position up to which the second connector 11 can be inserted into the first connector 10, which is defined by the structure of the first connector 10, the second connector 11, and other parts, or in front of the deepest position in the insertion direction. That is, the connection length L2 is preferably equal to or shorter than a connection length L3 (not illustrated) at the deepest position (L2≤L3). This is because, if the second connector 11 is inserted into the first connector 10 beyond the deepest position, the first connector 10, the second connector 11, or other parts may be damaged. As illustrated in FIGS. 7 and 8, the deepest position may be set as a position where a first engagement portion 26 (first contact portion) provided, for example, as a protrusion to the first connector 10 and a second engagement portion 27 (second contact portion) provided, for example, as a recess to the second connector 11 are in contact and engage with each other (contact position, engagement position), but it is not limited thereto.

According to the first embodiment, in the state where the HDD unit 9 is installed in the housing 2a as illustrated in FIG. 11 (i.e., the state where the first connector 10 and the second connector 11 are connected with the gap G, the HDD 22 is located at the first position P1) as well as in the state where the second connector 11 is inserted deeper into the first connector 10 along with the deformation of the arm 24e as the first buffer as illustrated in FIG. 12 (i.e., the state where the HDD 22 is located at the second position P2) and the state between them, the terminals 10a of the first connector 10 and the terminals 11a of the second connector 11 are maintained in conductive contact and electrically connected to one another. In other words, the circuit board 25 is kept electrically connected to the HDD 22 via the first connector 10 and the second connector 11. Accordingly, if the arm 24e is deformed by a shock or the like, electrical connection between the HDD 22 and the circuit board (not illustrated) is ensured, and thus the operation of the broadcast receiver 1 (access to the HDD 22) is unlikely to be affected. Preferably, in the state where the HDD 22 is located at the deepest position, the circuit board 25 is kept electrically connected to the HDD 22 via the first connector 10 and the second connector 11.

Figure 13:
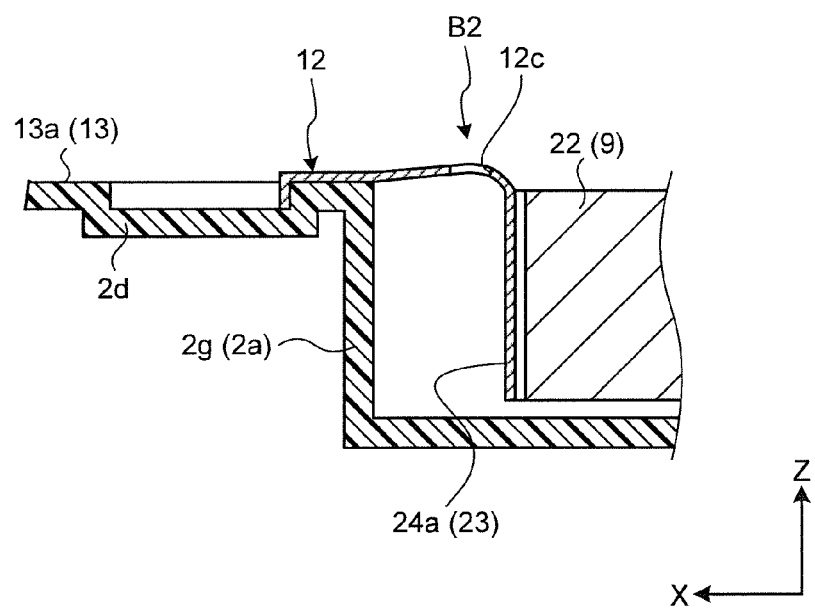
FIG. 13 is an exemplary cross-sectional view of the other edge of the holder of the module in the broadcast receiver and the housing of the broadcast receiver in the first embodiment.

According to the first embodiment, as illustrated in FIGS. 2 to 4, the flange 24f as a reinforcing portion for the frame 24b is provided in such a manner as to extend over the arm 24e as the first buffer. The flange 24f stands at the edge of the frame 24b and extends along the edge of the frame 24b from an end to the other of the frame 24b in the longitudinal direction. Accordingly, if a heavier load acts from the wall 2f toward the HDD 22 and a second wall 2g, which is opposite the wall 2f with respect to the HDD 22, and the HDD 22 come close to each other, the load is transmitted from the end 24g to the opposite side of the end 24g via the frame 24b and the flange 24f. With this, as illustrated in FIG. 13, the second buffer B2 is deformed. That is, according to the first embodiment, with the structure of the frame 24b and the flange 24f as described above, the second buffer B2 is plastically deformed, which achieves higher buffering effect. In the first embodiment, the bracket 12 corresponds to a connection portion, the frame 24b corresponds to a bridge, and the flange 24f corresponds to a reinforcing portion.

As described above, according to the first embodiment, there is provided the buffer B1 that is plastically deformed when the wall 2f and the HDD 22 as a module come relatively close to each other in a direction in which the first connector 10 and the second connector 11 are connected (the X direction). Accordingly, if the broadcast receiver 1 as an electronic device falls or the like, load imposed on the HDD 22 is reduced, and the protection of the HDD 22 can be improved. Besides, the holder 23 is partly narrowed to form the first buffer B1 having a relatively simple structure. The component 17 is located between the end 24g of the holder 23 and the wall 2f. With the component 17, the first buffer B1 can be effectively deformed.

Figure 14:
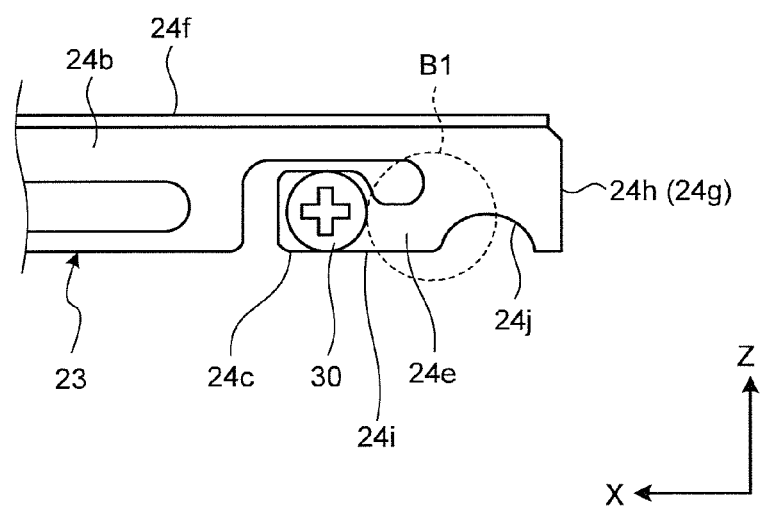
FIG. 14 is an exemplary side view of a first modification of the holder of the module in the broadcast receiver and the housing of the broadcast receiver in the first embodiment.

The first buffer can be variously modified. For example, FIG. 14 illustrates a first modification in which the frame 24b is provided with a notch 24j at an edge 24i. The notch 24j provides the first buffer B1 as a narrow portion at the base side of the arm 24e.

Figure 15:
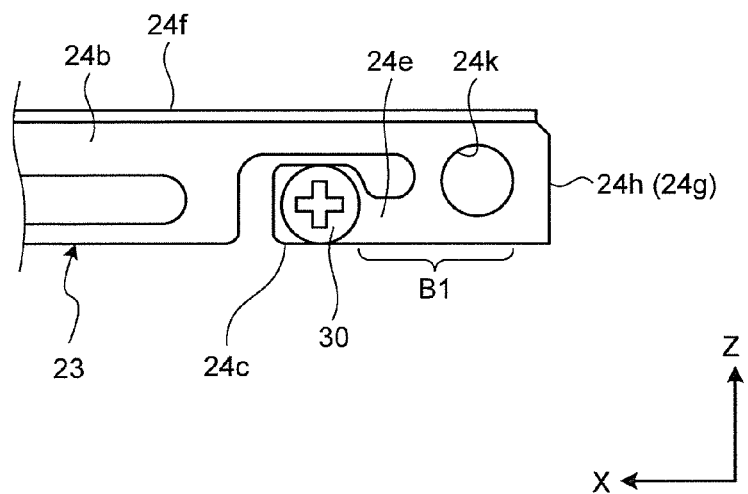
FIG. 15 is an exemplary side view of a second modification of the holder of the module in the broadcast receiver and the housing of the broadcast receiver in the first embodiment.

FIG. 15 illustrates a second modification in which the frame 24b is provided with a circular through hole 24k between the holding portion 24c and the end 24g. The through hole 24k provides the first buffer B1 as a narrow portion between the holding portion 24c and the end 24g.

Figure 16:
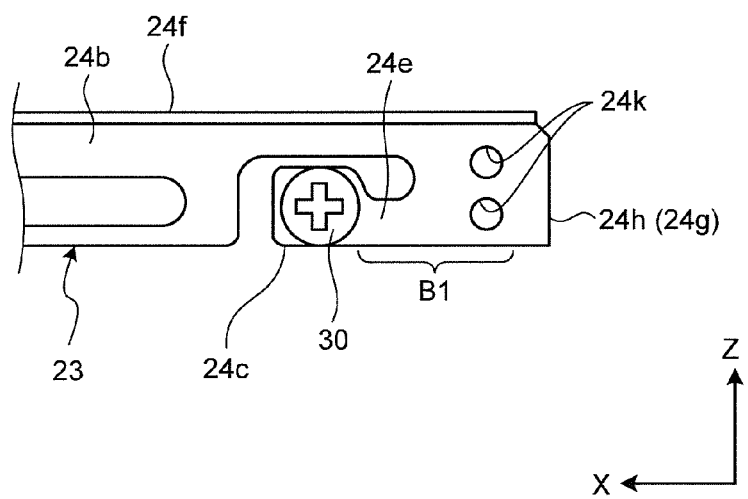
FIG. 16 is an exemplary side view of a third modification of the holder of the module in the broadcast receiver and the housing of the broadcast receiver in the first embodiment.

FIG. 16 illustrates a third modification in which the frame 24b is provided with a plurality of circular through holes 24k between the holding portion 24c and the end 24g. The through holes 24k provide the first buffer B1 as a narrow portion between the holding portion 24c and the end 24g.

Figure 17:
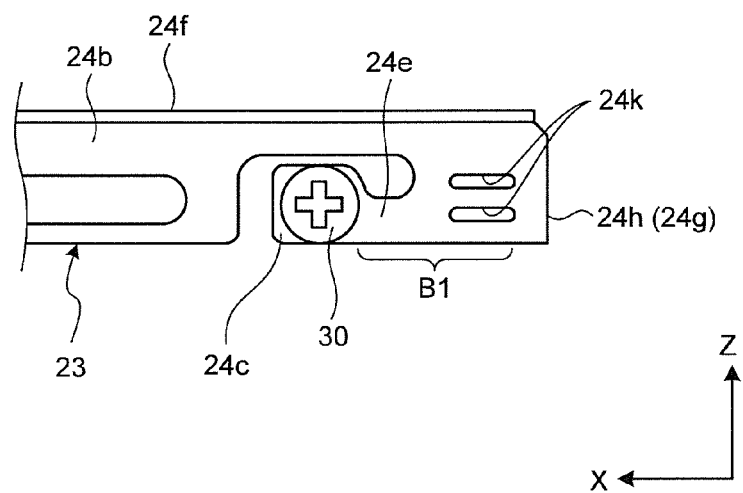
FIG. 17 is an exemplary side view of a fourth modification of the holder of the module in the broadcast receiver and the housing of the broadcast receiver in the first embodiment.

FIG. 17 illustrates a fourth modification in which the frame 24b is provided with a plurality of elongated circular through holes 24k between the holding portion 24c and the end 24g. The through holes 24k provide the first buffer B1 as a narrow portion between the holding portion 24c and the end 24g.

Figure 18:
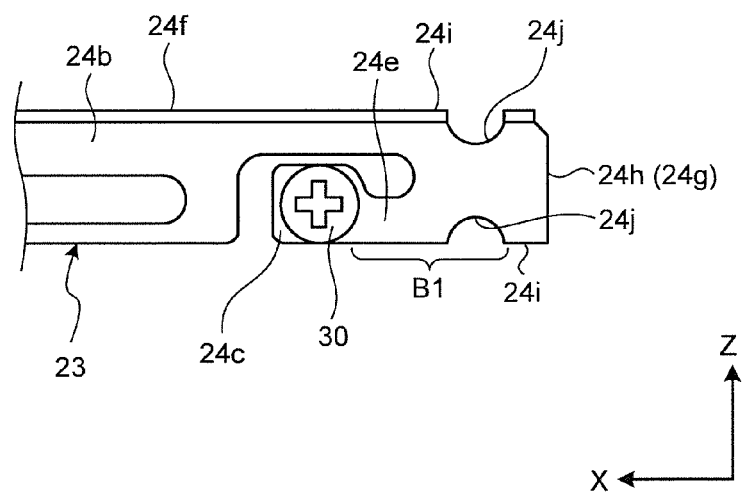
FIG. 18 is an exemplary side view of a fifth modification of the holder of the module in the broadcast receiver and the housing of the broadcast receiver in the first embodiment.

FIG. 18 illustrates a fifth modification in which the frame 24b is provided with notches 24j at two opposite edges 24i, respectively, between the holding portion 24c and the end 24g. The notches 24j provide the first buffer B1 as a narrow portion between the holding portion 24c and the end 24g.

Figure 19:
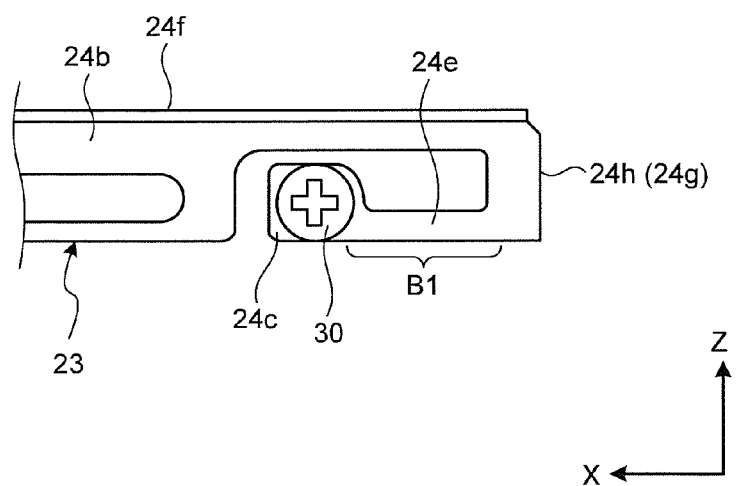
FIG. 19 is an exemplary side view of a sixth modification of the holder of the module in the broadcast receiver and the housing of the broadcast receiver in the first embodiment.

FIG. 19 illustrates a sixth modification in which there is provided the longer arm 24e. The arm 24e provides the first buffer B1 as a narrow portion that is plastically deformed with less load.

Figure 20:
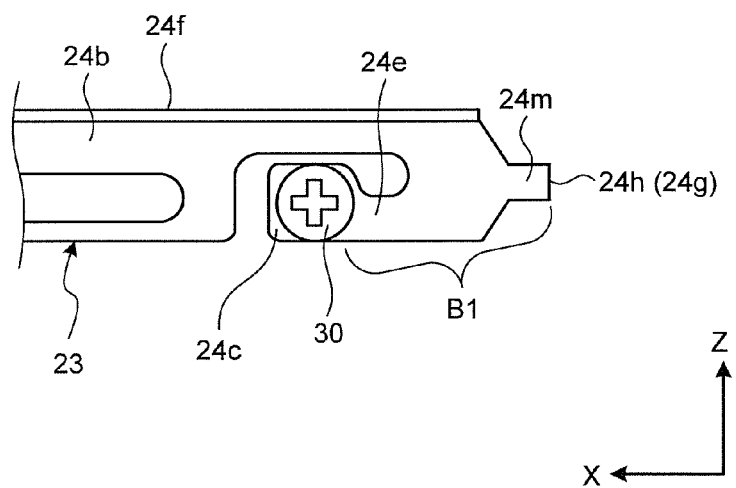
FIG. 20 is an exemplary side view of a seventh modification of the holder of the module in the broadcast receiver and the housing of the broadcast receiver in the first embodiment.

FIG. 20 illustrates a seventh modification in which the end 24g is provided with a protrusion 24m. The protrusion 24m provides the first buffer B1 as a narrow portion between the holding portion 24c and the end 24g.

Figure 21:
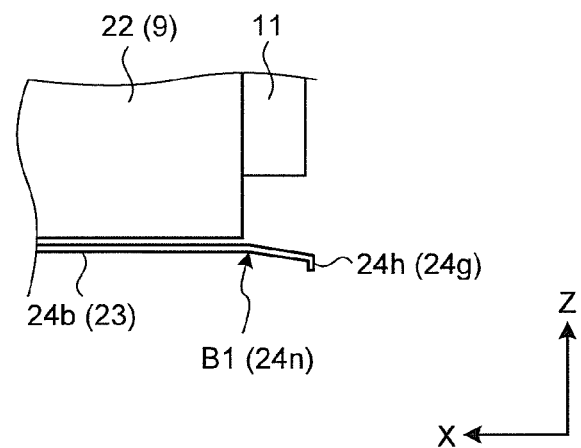
FIG. 21 is an exemplary side view of an eighth modification of the holder of the module in the broadcast receiver and the housing of the broadcast receiver in the first embodiment.

FIG. 21 illustrates an eighth modification in which the frame 24b is provided with a bent portion 24n as the first buffer B1. The flame 24b is deformed easier with the bent portion 24n as the origin. While FIG. 21 illustrates an example in which the frame 24b is bent from the holding portion 24c side to the end 24g side in a direction away from the second connector 11 with the bent portion 24n as the origin, it may be bent from the holding portion 24c side to the end 24g side in a direction toward the second connector 11.

Figure 22:
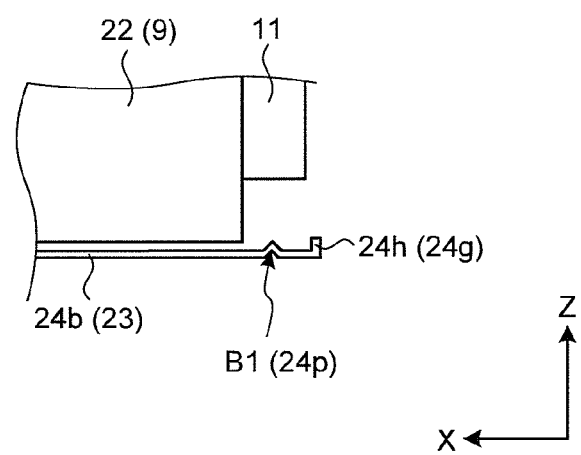
FIG. 22 is an exemplary side view of a ninth modification of the holder of the module in the broadcast receiver and the housing of the broadcast receiver in the first embodiment.

FIG. 22 illustrates a ninth modification in which the frame 24b is partly bent in a V shape to be provided with a bent portion 24p as the first buffer B1. The flame 24b is deformed easier with the bent portion 24p as the origin.

Figure 23:
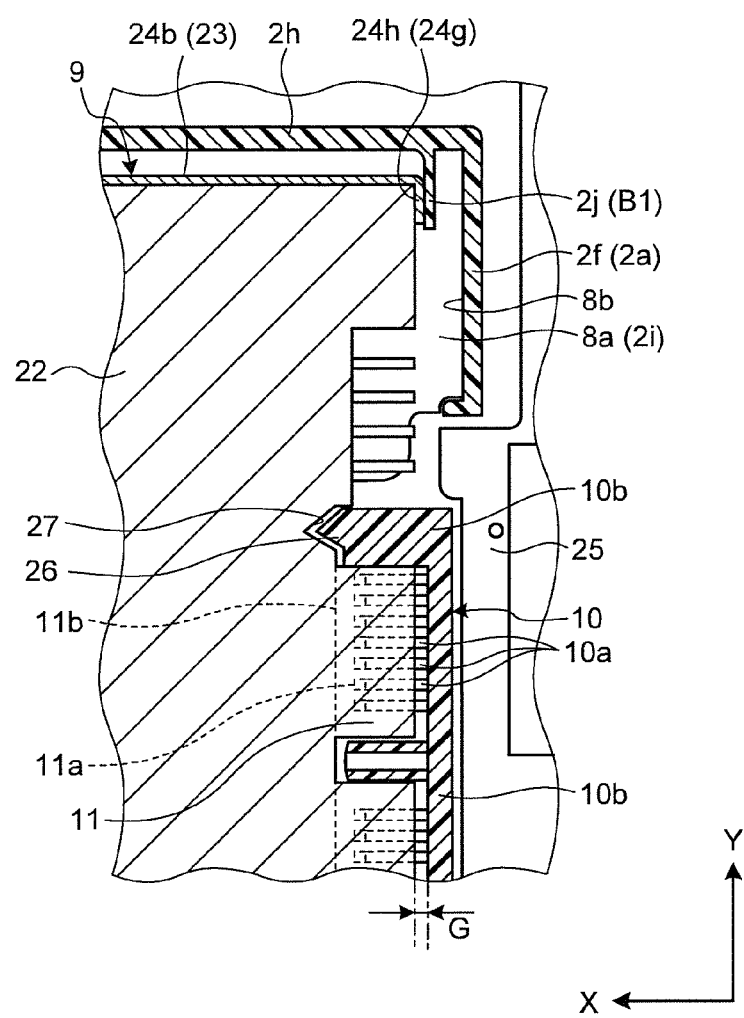
FIG. 23 is an exemplary side view of a tenth modification of the holder of the module in the broadcast receiver and the housing of the broadcast receiver in the first embodiment.

FIG. 23 illustrates a tenth modification in which the first buffer B1 is provided as a protrusion 2j protruding from a wall 2h as a side wall of the recess 8 or a wall 2i as the bottom wall (the bottom surface 8a). In the tenth modification, for example, the first buffer B1 is provided as the protrusion 2j that protrudes from both the walls 2h and 2i of the housing 2a. The protrusion 2j is plastically deformed in such a manner as to fall over to the wall 2f side due to a load acting from the HDD unit 9. The falling (plastic deformation) of the protrusion 2j facilitates to suppress a load acting on the HDD 22.

Figure 24:
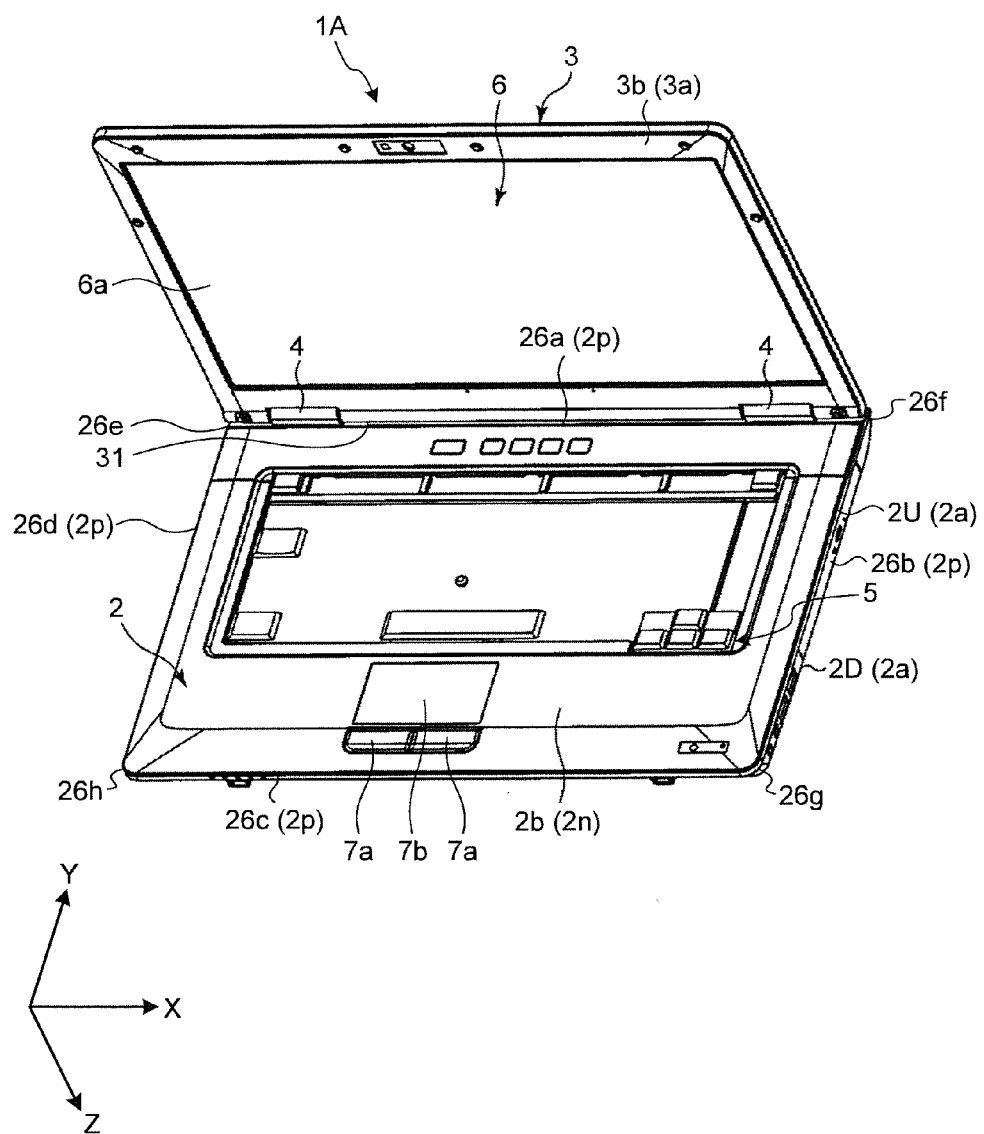
FIG. 24 is an exemplary perspective view of an electronic device according to a second embodiment.

As illustrated in FIG. 24, an electronic device 1A of a second embodiment is, for example, a notebook personal computer. The electronic device 1A comprises a flat rectangular first unit 2 and a flat rectangular second unit 3. The first unit 2 and the second unit 3 are connected by a hinge mechanism 4 to be relatively rotatable between an open position as illustrated in FIG. 24 and a closed position (not illustrated). The hinge mechanism 4 connects a side 26a of the first unit 2 and a side 31 of the second unit 3. In the second embodiment, for the sake of convenience, directions are defined based on the use state of the electronic device 1A as follows: X direction indicates the width direction (horizontal direction) of the housing 2a; Y direction indicates the depth direction of the housing 2a; and Z direction indicates the thickness direction (vertical direction) of the housing 2a. The X, Y, and Z directions are perpendicular to one another.

The first unit 2 is provided with a keyboard 5, click buttons 7a, a pointing device 7b, and the like as input devices, which are exposed on a front surface 2b as the outer surface of the housing 2a of the first unit 2. The second unit 3 is provided with a display 6 such as a liquid crystal display (LCD) as a display module. The display 6 comprises a display screen 6a which is exposed on a front surface 3b as the outer surface of a housing 3a of the second unit 3. In the open position as illustrated in FIG. 24, the keyboard 5, the display 6, the click buttons 7a, the pointing device 7b, and the like are exposed so that the user can use them. On the other hand, in the closed position, the front surface 2b closely faces the front surface 3b, and the keyboard 5, the display 6, the click buttons 7a, the pointing device 7b, and the like are hidden between the housings 2a and 3a.

Figure 25:
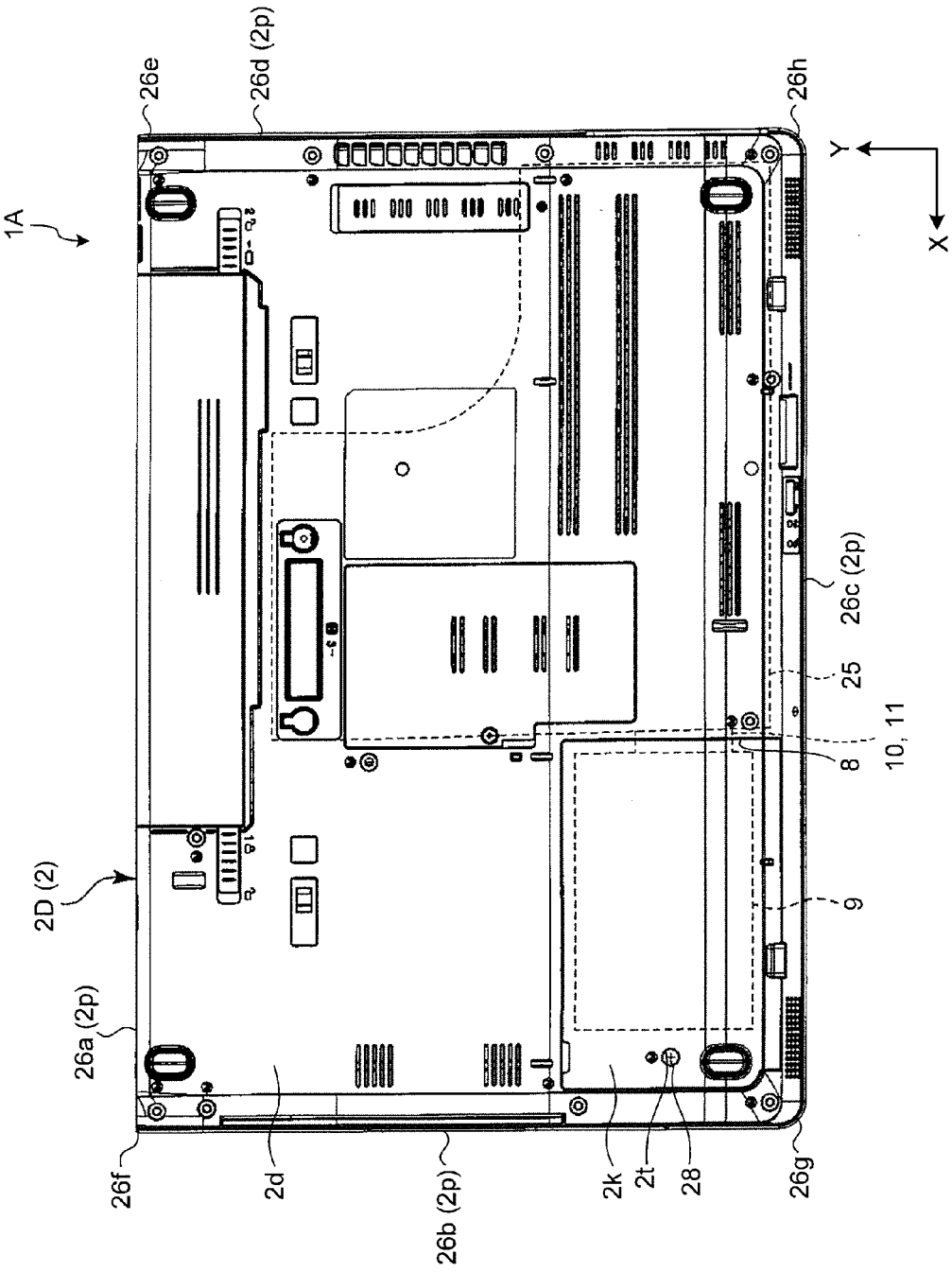
FIG. 25 is an exemplary plan view of the housing of the electronic device viewed from the bottom side in the second embodiment.

As illustrated in FIGS. 24 and 25, the first unit 2 has the shape of a rectangle long in the X direction and short in the Y direction in a plan view from the Z direction. The housing 2a of the first unit 2 has four sides 26a to 26d and four corners 26e to 26h. The housing 2a also has the wall 2d as a bottom wall forming a lower surface 2m, a top wall 2n located spaced apart from the bottom wall 2d, extending along the bottom wall 2d, and forming the front surface 2b, and a side wall 2p (circumferential wall, standing wall) extending between the circumference of the bottom wall 2d and that of the top wall 2n and standing with respect to the bottom wall 2d and the top wall 2n. When the broadcast receiver 1 is placed on a surface of a desk or the like, the lower surface 2m faces the surface. The top wall 2n has the keyboard 5, the click buttons 7a, the pointing device 7b, and the like mounted thereon. The housing 2a is formed of a combination of an upper housing 2U (first component) including the top wall 2n and a lower housing 2D (second component) including the bottom wall 2d.

The housing 2a of the first unit 2 houses therein the circuit board 25 having a central processing unit (CPU), a read only memory (ROM), a random access memory (RAM), and other components mounted thereon. The housing 2a also houses components (not illustrated) such as a cooling fan, and the like.

Figure 26:
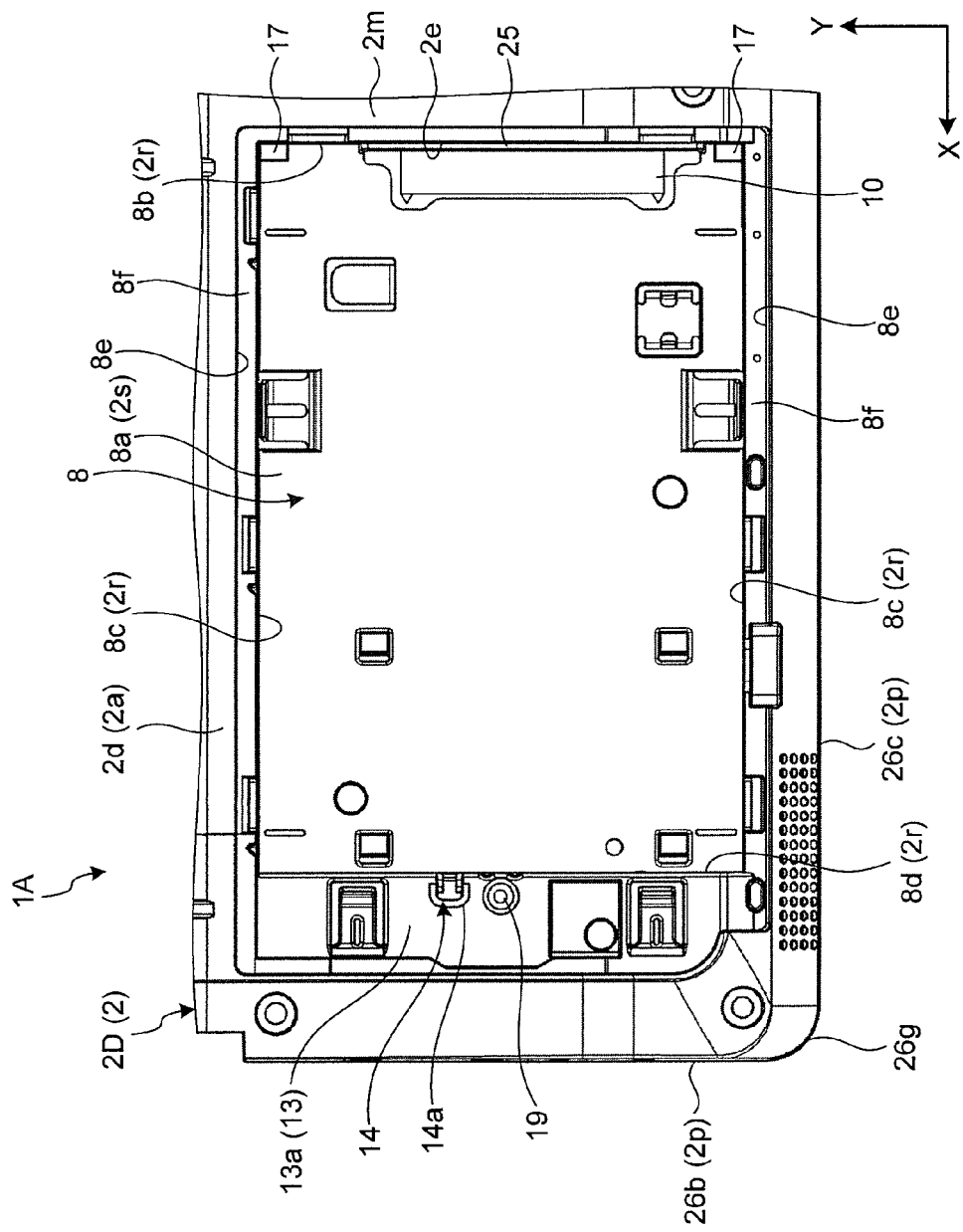
FIG. 26 is an exemplary plan view of a recess formed in the bottom of the housing of the electronic device in the second embodiment.

As illustrated in FIGS. 25 and 26, in the bottom wall 2d of the lower housing 2D of the first unit 2 is formed the recess 8 having a rectangular shape in a plane view along the thickness direction of the first unit 2 (the Z direction). The recess 8 has the same structure as previously described in the first embodiment and houses the HDD unit 9 including the HDD 22. The HDD unit 9 is of the same configuration as previously described in the first embodiment except that, in the second embodiment, the recess 8 has an opening in the lower surface 2m and, with respect to the state where the HDD unit 9 is installed in the broadcast receiver 1 of the first embodiment, the HDD unit 9 is installed upside down in the electronic device 1A such that the first surface 9a and the second surface 9b are inverted in position. Besides, on the inner circumferential side of an opening edge 8e of the recess 8 is formed a ring-like step 8f that is one step lower than the opening edge 8e. In the state where the circumference of a cover 2k is placed on the ring-like step 8f, the first connector 10 and the second connector 11 are connected to each other, and the recess 8 housing therein the HDD unit 9 is covered with the cover 2k. The side surfaces 8b, 8c, and 8d of the recess 8 are formed of a wall 2r as a side wall (circumferential wall, standing wall) standing from the bottom wall 2d in a direction crossing (for example, perpendicular to) the bottom wall 2d. The bottom surface 8a of the recess 8 is formed of a wall 2s that is in parallel to the bottom wall 2d and is connected to the wall 2r.

In the second embodiment also, the first connector 10 provided to the circuit board 25 is configured to be connected to the second connector 11 of the HDD 22. The recess 8 has the rectangular bottom surface 8a in a plan view. The first connector 10 is located on the side surface 8b of the recess 8 on one side in the X direction. The first connector 10 is relatively firmly fixed to the circuit board 25 housed in the housing 2a, and is exposed (protrudes) in the recess 8 via the opening 2e formed in the side surface 8b.

Further, in the second embodiment also, the recess 8 is provided with the step 13 on the side opposite the side surface 8b of the recess 8 (on the other side in the X direction). The step 13 is substantially parallel to the bottom surface 8a and is located between the bottom surface 8a and the opening edge 8e. As in the first embodiment (see FIGS. 5 and 6), the HDD unit 9 is slid toward the first connector 10 in the X direction (the right side in FIGS. 25 and 26) while being pushed to the bottom side of the recess 8 (the bottom surface 8a side). With this, the second connector 11 is connected to the first connector 10 and, on the opposite side, the claw 14a of the first engagement portion 14 engages with the second engagement portion 15 as an end portion of the slit 16 located opposite the second connector 11. Thus, the HDD unit 9 is installed in the recess 8 and is temporarily held (yet to be fixed by a screw as a fastener or the like). After that, the recess 8 is covered with the cover 2k, and the HDD unit 9 is fixed to the housing 2a together with the cover 2k by a screw 28 as a fastener. At this time, the screw 28 passes through a through hole 2t of the cover 2k as well as the notch 12a of the bracket 12, and is fixed to a female screw hole 19 as a fixed portion provided to the step 13.

As described above, according to the second embodiment, the same effects can be achieved as previously described in the first embodiment.

While the above embodiments are described as being applied to the broadcast receiver or PC, it may also be applied to other electronic devices such as a mobile phone, a smartbook, an electronic book terminal, a personal digital assistant (PDA), a game machine, and the like. The above embodiments may also be applied to other modules or components other than the HDD unit. Further, the structure of the holder can be variously modified. Besides, regarding the first connector, the second connector, the circuit board, the buffer, the second buffer, the holding portion, the edge, the narrow portion, the bent portion, the component, the second wall, the connection portion, the bridge, the reinforcing portion, the protrusion, and the like, the specifications (form, structure, location, shape, number, size, thickness, material, etc.) can be suitably modified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
   a housing comprising a wall;
   a circuit board in the housing, comprising a first connector;
   a module comprising a second connector configured to be electrically connected to the first connector and to fit to the first connector with a gap therebetween, the module configured to be movable between a first position where a connection length of the first connector and the second connector is a first length and a second position where the connection length is a second length, the second length being longer than the first length;
   a holder configured to hold the module; and
   a buffer provided to the holder, the buffer being substantially straight and extended in a direction in which the module is movable between the first position and the second position, the buffer being configured to be bent when the module is moved from the first position to the second position.

2. The electronic device of claim 1, wherein the buffer is located between a holding portion configured to hold the module held by the holder and an end of the holder on a side of the wall.

3. The electronic device of claim 2, wherein the buffer is a narrow portion of the holder.

4. The electronic device of claim 2, wherein the buffer is a bent portion of the holder.

5. The electronic device of claim 1, further comprising a component located between the wall and an end of the holder on a side of the wall.

6. The electronic device of claim 1, wherein
the housing comprising a second wall located opposite the module with respect to the wall, and
the holder comprising a connection portion connected to the second wall and a bridge extending between the connection portion and the wall,
the broadcast receiver further comprising a second buffer configured to be plastically deformed when the second wall and the module come close to each other in a direction in which the first connector and the second connector are connected.

7. The electronic device of claim 6, wherein the bridge comprising a reinforcing portion extending over the wall and the second wall.

8. The electronic device of claim 1, wherein the buffer is provided to the housing.

9. The electronic device of claim 1, wherein the buffer is provided as a protrusion to the wall or a wall other than the wall.

10. An electronic device comprising:
a housing comprising a wall;
a circuit board in the housing, comprising a first connector;
a module comprising a second connector configured to be electrically connected to the first connector and to fit to the first connector with a gap therebetween; and
a buffer configured to be substantially straight and extended in a direction in which the second connector is connected to the first connector, and configured to be plastically deformed when the wall and the module come close to each other in a direction in which the first connector and the second connector are connected.

11. An electronic device comprising:
a housing comprising a wall;
a circuit board in the housing, comprising a first connector;
a module comprising a second connector configured to be electrically connected to the first connector between a first position and a second position closer to the first connector than the first position; and
a buffer located between the wall and the module, the buffer being substantially straight and extended in a direction in which the second connector is connected to the first connector, the buffer being configured to be plastically deformed along with movement of the module from the first position to the second position.

* * * * *